A. T. HOPKINS.
PROCESS OF MAKING HOSE.
APPLICATION FILED AUG. 27, 1915.
1,190,292.
Patented July 11, 1916.
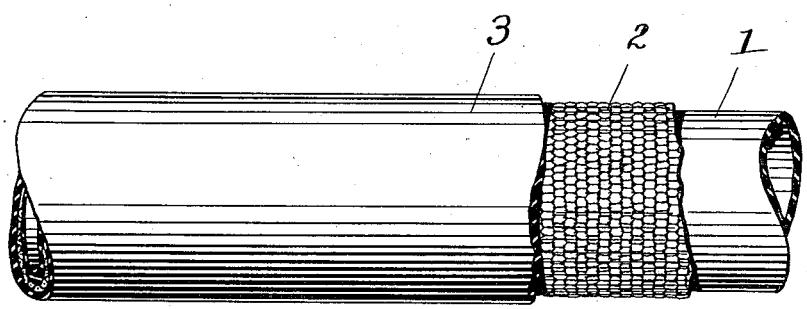
WITNESS:
S. G. Taylor
INVENTOR
A. T. Hopkins,
BY
Ernest Hopkinson
HIS ATTORNEY

UNITED STATES PATENT OFFICE.

ARTHUR T. HOPKINS, OF CLEVELAND, OHIO, ASSIGNOR TO THE MECHANICAL RUBBER COMPANY, A CORPORATION OF NEW JERSEY.

PROCESS OF MAKING HOSE.

1,190,292.     Specification of Letters Patent.     Patented July 11, 1916.

Application filed August 27, 1915. Serial No. 47,580.

*To all whom it may concern:*

Be it known that I, ARTHUR T. HOPKINS, a citizen of the United States, residing in Cleveland, county of Cuyahoga, and State of Ohio, have invented certain new and useful Improvements in Processes of Making Hose, of which the following is a full, clear, and exact description.

My invention relates to hose or similar conductive tubing composed of rubber and fabric, and the object thereof is to produce such hose in a more economical, expeditious and efficient manner than has heretofore been accomplished.

A further object of my invention is to produce a hose which is rubber-lined and rubber-covered, while at the same time the fabric portion thereof may be made of woven strands as distinguished from braided strands, as has heretofore been the practice in this type of hose.

For a detailed description of one manner of carrying out my process, reference may be had to the following specification and to the accompanying drawing forming a part thereof, in which:

The figure of the drawing shows a portion or piece of hose made according to my process, the fabric and outer layer being successively cut away from the inner rubber layer to disclose the relation of said parts.

Referring to the drawing, the numeral 1 indicates an inner layer of rubber.

The numeral 2 indicates an intermediate layer of fabric woven on the usual circular loom, and the numeral 3 indicates an outer protective layer of rubber.

The process which I prefer to use in the construction of this hose is as follows: The inner lining or tube is made from stock in the form of a complete tube by forcing the stock through what is known as a "tubing machine." This stock is then semi-cured to maintain its tubular form without serious distortion, after which a covering of fabric is woven thereon in a circular loom. This fabric is placed upon the inner lining when the latter is in a collapsed condition, the fabric being woven at the weaving point about a hollow pin or mandrel through which the inner lining passes while collapsed, and from there the fabric slips onto said lining, this type of circular loom being well known in the art. The tube is then inflated under air pressure and the outer covering put on by passing the hose through a second tubing machine. The hose may then be cured by passing steam therethrough at the requisite temperature while the hose is placed on a curing table in open air, or while surrounded by any other suitable curing medium. If it is desired to cure the hose by subjecting the exterior to curing heat, the hose may be helically wrappd with a strip of fabric in a suitable wrapping machine, after which the hose is placed in the vulcanizer and cured in the usual way, steam or water being supplied under pressure to the interior.

This method of manufacturing hose results in a hose that is extremely durable and at the same time one that is much stronger than hose manufactured by braiding or winding a fabric layer about the inner tube. The process also results in a great saving of time and expense in the manufacture of hose, without in any way causing depreciation in the quality thereof.

Having thus described this form of my invention, what I claim and desire to protect by Letters Patent is:

1. The process of manufacturing hose which comprises forming a continuous inner tube of rubber stock in a tubing machine, semi-curing said tube, forming an intermediate layer of helically interwoven fibrous strands about said inner tube, forming an outer covering of rubber stock by passing said inner tube and fibrous layer through a tubing machine while inflated, and then finally curing the whole in any suitable way.

2. The process of manufacturing hose which comprises forming a continuous inner tube of rubber stock in a tubing machine, semi-curing said tube, forming an intermediate layer of helically interwoven fibrous strands about said inner tube while in collapsed condition, inflating said inner tube and fibrous layer, forming an outer covering of rubber stock by passing said inner tube and fibrous layer through a tubing machine while in inflated condition, and then curing the whole by subjecting the interior thereof to a heated vulcanizing medium under pressure.

Signed at Cleveland, Ohio, this 19th day of August, 1915.

ARTHUR T. HOPKINS.